(12) United States Patent
Wickenkamp

(10) Patent No.: US 10,567,840 B2
(45) Date of Patent: *Feb. 18, 2020

(54) SYSTEMS AND METHODS FOR SORTING MEDIA ASSETS BASED ON PLAYBACK INFORMATION

(71) Applicant: Rovi Guides, Inc., San Jose, CA (US)

(72) Inventor: Vanessa Wickenkamp, Elmhurst, IL (US)

(73) Assignee: Rovi Guides, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/054,515

(22) Filed: Aug. 3, 2018

(65) Prior Publication Data

US 2018/0376199 A1    Dec. 27, 2018

Related U.S. Application Data

(63) Continuation of application No. 15/400,339, filed on Jan. 6, 2017, now Pat. No. 10,070,180, which is a
(Continued)

(51) Int. Cl.
*H04N 5/445* (2011.01)
*H04N 21/442* (2011.01)
*H04N 21/482* (2011.01)
*H04N 21/45* (2011.01)
*G06F 16/70* (2019.01)
*G06F 16/738* (2019.01)
(Continued)

(52) U.S. Cl.
CPC ....... *H04N 21/44222* (2013.01); *G06F 16/70* (2019.01); *G06F 16/738* (2019.01); *G06F 16/743* (2019.01); *G06F 16/7867* (2019.01); *H04H 60/46* (2013.01); *H04N 5/44543* (2013.01); *H04N 21/252* (2013.01); *H04N 21/25891* (2013.01); *H04N 21/4532* (2013.01); *H04N 21/472* (2013.01); *H04N 21/4826* (2013.01); *H04N 21/6582* (2013.01); *H04N 21/812* (2013.01); *H04H 60/64* (2013.01)

(58) Field of Classification Search
CPC ........... H04N 21/4532; H04N 21/4623; H04N 21/84; H04N 21/482; H04N 21/44222; H04N 7/163; H04N 7/165; H04N 7/17318
See application file for complete search history.

(56) References Cited

U.S. PATENT DOCUMENTS

| 2002/0100052 A1* | 7/2002 | Daniels | G11B 27/024 |
| | | | 725/87 |
| 2003/0005453 A1* | 1/2003 | Rodriguez | H04N 7/17318 |
| | | | 725/87 |

(Continued)

*Primary Examiner* — Annan Q Shang
(74) *Attorney, Agent, or Firm* — Haley Guiliano LLP

(57) ABSTRACT

Systems and methods for sorting media assets are provided. Playback information for each of a plurality of media assets is received, the playback information representing a percentage of a length of the corresponding media asset that each of a plurality of users previously viewed. Representations of the plurality of media assets are generated. The representations of the plurality of media assets are sorted based on the percentage of the length of the corresponding media asset that each of a plurality of users previously viewed. The sorted representations of the plurality of media assets are generated for display to a first user.

20 Claims, 6 Drawing Sheets

Related U.S. Application Data continuation of application No. 14/188,887, filed on Feb. 25, 2014, now Pat. No. 9,578,385.

(51) Int. Cl.

| | | |
|---|---|---|
| *G06F 16/74* | (2019.01) | |
| *G06F 16/78* | (2019.01) | |
| *H04N 21/25* | (2011.01) | |
| *H04N 21/258* | (2011.01) | |
| *H04N 21/658* | (2011.01) | |
| *H04H 60/46* | (2008.01) | |
| *H04N 21/81* | (2011.01) | |
| *H04N 21/472* | (2011.01) | |
| *H04H 60/64* | (2008.01) | |

(56) References Cited

U.S. PATENT DOCUMENTS

| | | | | |
|---|---|---|---|---|
| 2008/0193102 A1* | 8/2008 | Tischer | .................. | H04N 5/783 386/287 |
| 2008/0279534 A1* | 11/2008 | Buttars | ................ | H04L 63/061 386/252 |
| 2009/0222520 A1* | 9/2009 | Sloo | .................. | H04N 7/17318 709/205 |
| 2010/0043046 A1* | 2/2010 | Sen | .................... | H04N 7/17318 725/133 |
| 2010/0172626 A1* | 7/2010 | Lee | ........................ | G06Q 30/02 386/343 |
| 2011/0013888 A1* | 1/2011 | Sasaki | .................. | G11B 27/034 386/353 |
| 2011/0250883 A1* | 10/2011 | Pyhtila | .................. | H04W 24/08 455/424 |
| 2011/0321089 A1* | 12/2011 | Holley | ............... | H04N 5/44543 725/39 |
| 2012/0141095 A1* | 6/2012 | Schwesinger | ........ | H04N 21/431 386/290 |
| 2013/0294755 A1* | 11/2013 | Arme | .................. | A61B 18/1492 386/344 |
| 2013/0297706 A1* | 11/2013 | Arme | .................. | H04N 21/4788 709/206 |
| 2013/0311575 A1* | 11/2013 | Woods | ............... | H04N 21/6582 709/206 |
| 2014/0020017 A1* | 1/2014 | Stern | ................ | H04N 21/23611 725/34 |

\* cited by examiner

SYSTEMS AND METHODS FOR SORTING MEDIA ASSETS BASED ON PLAYBACK INFORMATION

CROSS REFERENCE TO RELATED APPLICATIONS

This patent application is a continuation of U.S. patent application Ser. No. 15/400,339, filed Jan. 6, 2017, (allowed), which is a continuation of U.S. patent application Ser. No. 14/188,887, filed Feb. 25, 2014, now U.S. Pat. No. 9,578,385, issued Feb. 21, 2017. The disclosures of which are hereby incorporated by reference herein in their entireties.

BACKGROUND

Conventional media systems allow users to access a plethora of media content. Moreover, the expanded storage capabilities offered by DVRs, computer hard drives, and cloud-based systems allow users to store seemingly unlimited amounts of content. Often the amount of content received by a user, and subsequently stored, may become overwhelming. Particularly, the user may not have the time or enthusiasm to review each received media asset to determine whether or not to watch the media asset.

SUMMARY

In view of the foregoing, systems and methods for sorting media assets based on playback information are provided. Specifically, the systems and methods rank representations of a plurality of media assets based on a percentage of a length of the corresponding media asset that each of a plurality of users previously viewed. This may provide a good indication to the user about whether other users enjoyed viewing a given media asset based on how much of the media asset they actually viewed.

In some embodiments, playback information for each of a plurality of media assets is received and representations of the plurality of media assets may be generated. In some implementations, the plurality of media assets may correspond to media assets that match a profile of a first user. In some implementations, the plurality of media assets may correspond to media assets that are popular. The playback information may be retrieved from a viewing history associated with each of the plurality of media assets.

In some implementations, the playback information may represent a percentage of a length of the corresponding media asset that each of a plurality of users previously viewed. In some implementations, the playback information for a first of the plurality of media assets may be processed to identify at least one portion of the first media asset through which a fast-access playback operation was performed by at least one of the users. The percentage of the length that was previously viewed by a user may be computed based on the length of the first media asset and a length of the portion of the first media asset through which the fast-access playback operation was performed. The representations of the plurality of media assets may be sorted based on the percentage of the length of the corresponding media asset that each of a plurality of users previously viewed. The percentage of the length may be a representative percentage that is computed based on a combination of the percentage viewed by each of the users.

In some implementations, the fast-access playback operation causes a portion of the first media asset to be repeated. In some implementations, a portion of the first media asset may be repeated due to replaying of the first media asset from the beginning by the same or other users. In such circumstances, the percentage of the length of the first media asset that was previously viewed is more than one hundred percent. In some implementations, the fast-access playback operation causes a portion of the first media asset to be skipped. In such circumstances, the percentage of the length that was previously viewed is less than one hundred percent.

In some embodiments, a viewing history for a first of the plurality of media assets is retrieved. The viewing history may indicate a first percentage of the first media asset that was viewed by a first user of the plurality of users and a second percentage of the first media asset that was viewed by a second user of the plurality of users. The percentage of the length that was previously viewed may be computed based on an average of the first and second percentages.

In some embodiments, the playback information may be processed for a first of the plurality of media assets to identify at least one portion of the first media asset through which a fast-access playback operation was performed. A determination is made as to whether the at least one portion includes content that satisfies a criterion. In response to determining that the at least one portion includes content that satisfies a criterion, a length of the at least one portion is reduced by a duration of the content that satisfies the criterion. The percentage of the length that was previously viewed may be computed based on the length of the first media asset and the reduced length of the at least one portion. In some implementations, the determination of whether the at least one portion includes content that satisfies a criterion includes a determination as to whether the at least one portion includes content that is an advertisement.

The plurality of users that previously viewed the media asset may be any user who previously viewed the media asset or may be selected to be limited to users that are associated with the first user. For example, the plurality of users may be friends of the first user on a social network or may be within a geographical proximity to the first user or may share interests with the first user.

In some implementations, the playback information may represent a total number of fast-access playback operations performed by each of the plurality of users while viewing the media asset. The representations of the plurality of media assets may be sorted based on the number of fast-access playback operations performed by each of the plurality of users. The number of fast-access playback operations may be a representative number that is computed based on a combination of the number of fast-access playback operations performed by each of the users. In some implementations, a first representation of a first of the plurality of media assets may be ranked higher in the sorting than a second representation of a second of the plurality of media assets. Specifically, the first representation may be ranked higher than the second in response to determining that the number of times each of the plurality of users requested one or more fast-access playback operations to be performed while accessing the first media asset is less than the number of times each of the plurality of users requested one or more fast-access playback operations to be performed while accessing the second media asset.

In some implementations, the playback information may represent a number of times the same media asset was replayed or repeated partially or entirely. The representations of the plurality of media assets may be sorted based on the number of times the same media asset was replayed or repeated partially or entirely by each of a plurality of users.

In some implementations, the playback information may represent a number of users who recorded a media asset but did not view the media asset. The representations of the plurality of media assets may be sorted based on the number of users who recorded a given media asset but did not view the media asset.

In some embodiments, the sorted representations of the plurality of media assets may be generated for display to the first user.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which.

DETAILED DESCRIPTION

Figure 1:
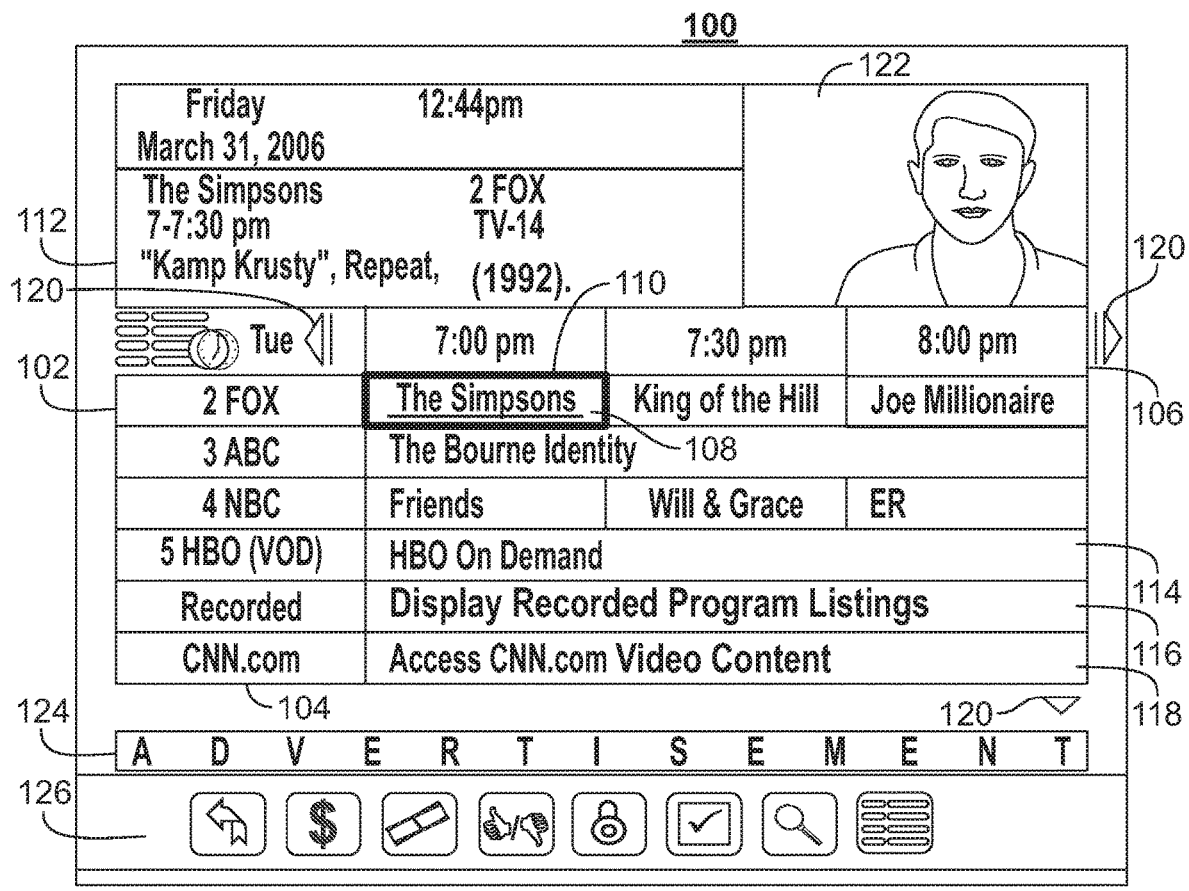
FIGS. 1 and 2 show illustrative display screens that may be used to provide media guidance application listings in accordance with an embodiment of the invention.

In some embodiments, media assets may be organized based on playback information. In particular, media asset listings may be sorted and arranged in an order that is based on a representative percentage of the media asset that was viewed by other users and/or based on a representative number of fast-access playback operations performed by other users while viewing the media assets. The organization of the media assets based on the playback information may simplify the user's choice of which content to access or view.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content.

As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, webcasts, etc.), a collection of episodes in a series, a single episode in a series, video clips, audio, content information, pictures, rotating images, documents, playlists, websites, articles, books, electronic books, blogs, advertisements, chat sessions, social media, chat rooms, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase, "media guidance data" or "guidance data" should be understood to mean any data related to content, such as media listings, media-related information (e.g., broadcast times, broadcast channels, titles, descriptions, ratings information (e.g., parental control ratings, critic's ratings, etc.), messages from a crowd of users on a social network, playback information, messages from a crowd of users posted to a blog or website, genre or category information, actor information, logo data for broadcasters' or providers' logos, etc.), media format (e.g., standard definition, high definition, 3D, etc.), advertisement information (e.g., text, images, media clips, etc.), popularity information, on-demand information, blogs, websites, and any other type of guidance data that is helpful for a user to navigate among and locate desired content selections. In some implementations, this data may be referred to as a data feed. As referred to herein, the term "crowd" should be understood to mean any number of users greater than one.

As referred to herein, the phrase "playback information" should be understood to mean data that identifies media asset consumption behavior of one or more users. The consumption behavior may identify a percentage of the media asset each user has viewed, positions at which a fast-access playback operation was performed by each user, duration of each fast-access playback operation, number of times the same media asset was replayed or repeated partially or entirely by one or more users, whether the media asset was recorded but was not viewed by a user, criteria of content presented while the fast-access playback operation was performed, or any combination thereof.

As referred to herein, the phrase "fast-access playback operation" should be understood to mean any operation that pertains to playing back a non-linear media asset faster than normal playback speed or in a different order than the media asset is designed to be played, such as a fast-forward, rewind, skip, chapter selection, segment selection, skip segment, jump segment, next segment, previous segment, skip advertisement or commercial, next chapter, previous chapter or any other operation that does not play back the media asset at normal playback speed. The fast-access playback operation may be any playback operation that is not "play," where the play operation plays back the media asset at normal playback speed.

Figure 2:
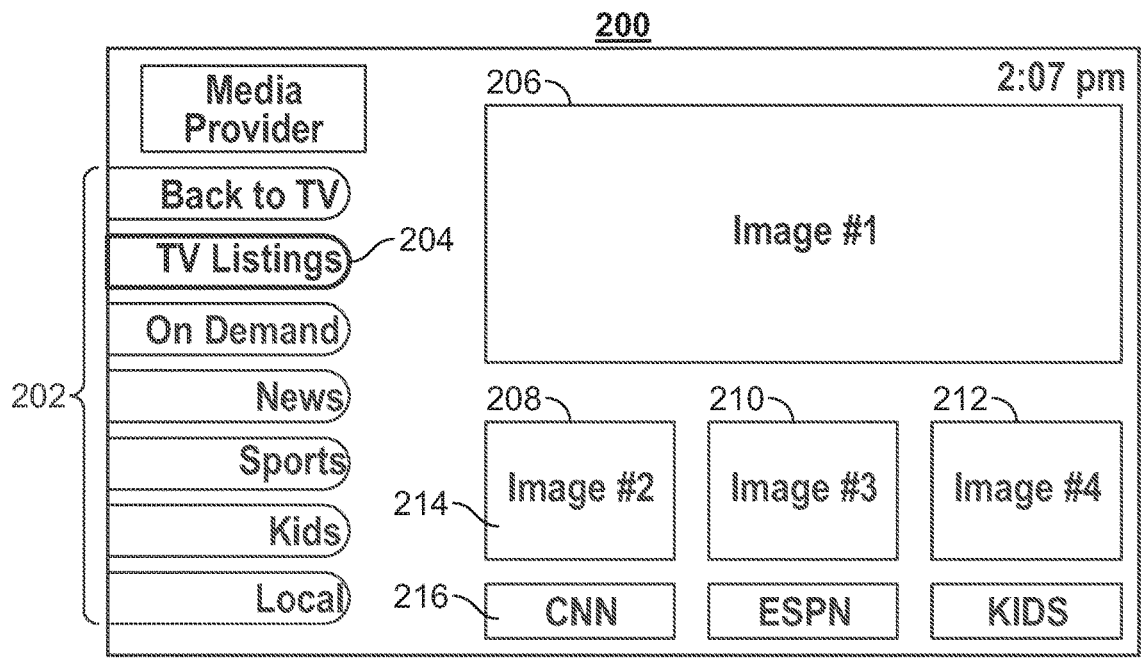
Figure 5:
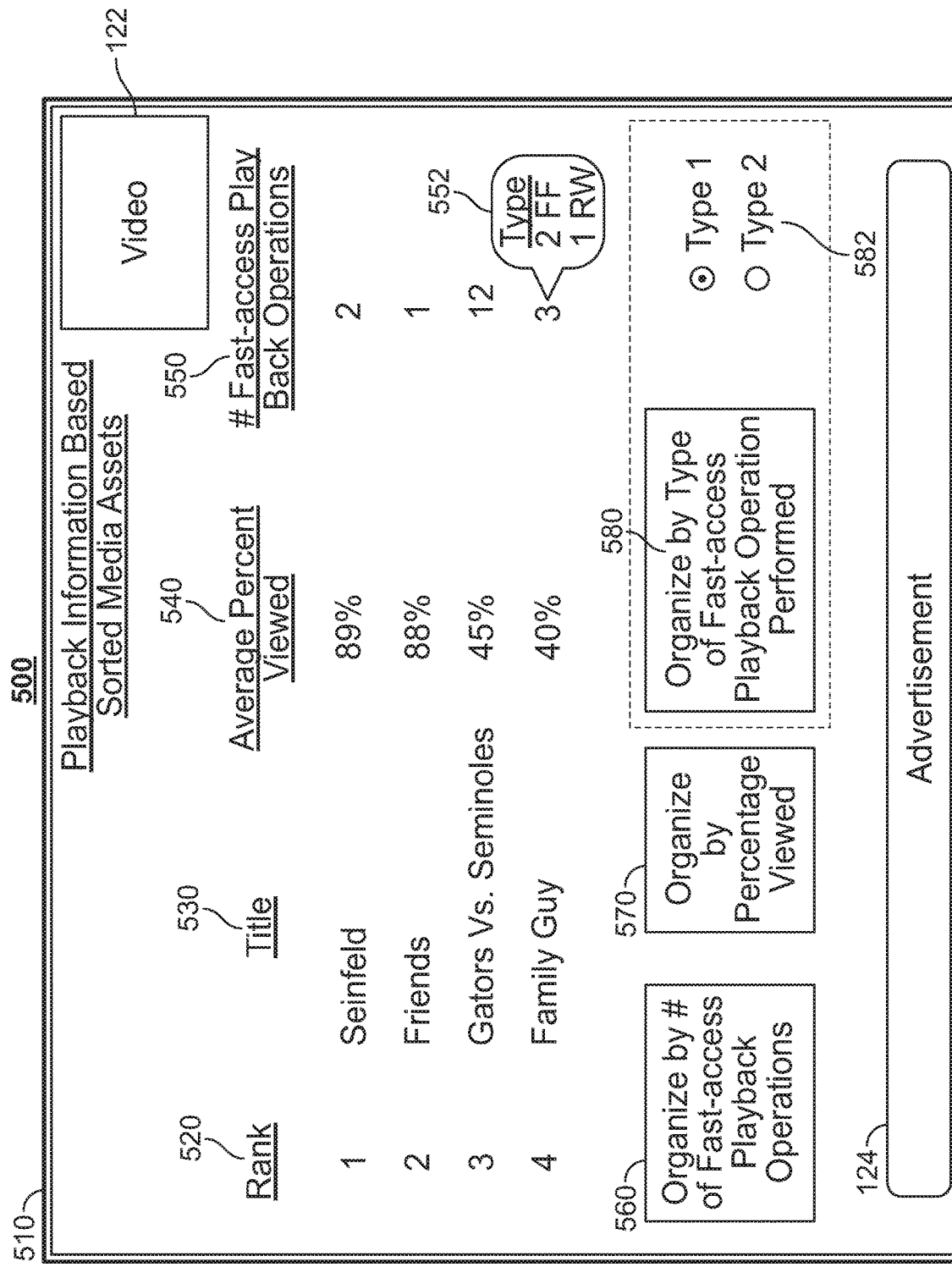
FIG. 5 shows an illustrative display of a screen for sorting media assets based on playback information in accordance with an embodiment of the invention.

FIGS. 1-2 show illustrative display screens that may be used to provide media guidance data. The display screens shown in FIGS. 1-2 and 5 may be implemented on any suitable user equipment device or platform. While the displays of FIGS. 1-2 and 5 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by playback information associated with a plurality of users, by number of fast-access playback operation(s) performed by a plurality of users, by type of fast-access playback operation(s) performed by a plurality of users, by percentage of the media asset viewed by a plurality of users, by category (e.g., movies, sports, news, children, or other categories of programming), or other predefined, user-defined, or other organization criteria. The organization of the media guidance data is determined by guidance application data. As referred to herein, the phrase, "guidance application data" should be understood to mean data used in operating the guidance application, such as program information, guidance application settings, user preferences, or user profile information. The terms "organize," "sort" and "rank" are used interchangeably and should all be understood to have the same meaning.

As referred to herein, the phrase "in response" should be understood to mean automatically, directly and immediately as a result of, without further input from the user, or automatically based on the corresponding action where intervening inputs or actions may occur.

FIG. 1 shows illustrative grid program listings display 100 arranged by time and channel that also enables access to different types of content in a single display. Display 100 may include grid 102 with: (1) a column of channel/content type identifiers 104, where each channel/content type identifier (which is a cell in the column) identifies a different channel or content type available; and (2) a row of time identifiers 106, where each time identifier (which is a cell in the row) identifies a time block of programming. Grid 102 also includes cells of program listings, such as program listing 108, where each listing provides the title of the program provided on the listing's associated channel and time. With a user input device, a user can select program listings by moving highlight region 110. Information relating to the program listing selected by highlight region 110 may be provided in program information region 112. Region 112 may include, for example, the program title, the program description, the time the program is provided (if applicable), the channel the program is on (if applicable), the program's rating, program's popularity, and other desired information.

Popularity of a media asset may be determined based on popularity information, which may include information on real time ratings (e.g., how many users are watching these media assets at this time), past ratings (e.g., how many users have previously watched this media asset by either receiving it from media content source 416 or by watching it from another source, such as in a movie theatre), ratings (e.g., a combination of both or either one of real time ratings and past ratings), critic scores, user scores, and/or user reactions. Popularity information may be received by media guidance data source 418 and/or user equipment device 300 from the third party server (e.g., a ratings website or other source of information associated with media assets) and/or media guidance data source 418 may collect the popularity information by collecting user interaction information from some or all user equipment devices in system 400 (e.g., the media guidance data source 418 may generate past ratings by collecting user interaction information on how often a particular media asset has been watched by users of system 400 and/or transmitted to user equipment devices in system 400). For example, media guidance data source 418 may receive past ratings from a third party server (e.g., the media guidance application may download box office results of a media asset from a website), receive user scores from user equipment devices, and use both sets of information to select the media assets.

In addition to, or alternative to, providing access to linear programming (e.g., content that is scheduled to be transmitted to a plurality of user equipment devices at a predetermined time and is provided according to a schedule), from content sources (e.g., television channels or scheduled streaming sources) the media guidance application may also provide access to non-linear programming (e.g., content accessible to a user equipment device at any time and not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet website or other Internet access (e.g., FTP).

Grid 102 may provide media guidance data for non-linear programming including on-demand listing 114, recorded content listing 116, and Internet content listing 118. A display combining media guidance data for content from different types of content sources is sometimes referred to as a "mixed-media" display. Various permutations of the types of media guidance data that may be displayed that are different from display 100 may be based on user selection or guidance application definition (e.g., a display of only recorded and broadcast listings, only on-demand and broadcast listings, etc.). As illustrated, listings 114, 116, and 118 are shown as spanning the entire time block displayed in grid 102 to indicate that selection of these listings may provide access to a display dedicated to on-demand listings, recorded listings, or Internet listings, respectively. In some embodiments, listings for these content types may be included directly in grid 102. Additional media guidance data may be displayed in response to the user selecting one of the navigational icons 120. (Pressing an arrow key on a user input device may affect the display in a similar manner as selecting navigational icons 120.)

Display 100 may also include video region 122, advertisement 124, and options region 126. Video region 122 may allow the user to view and/or preview programs that are currently available, will be available, or were available to the user. The content of video region 122 may correspond to, or be independent from, one of the listings displayed in grid 102. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Advertisement 124 may provide an advertisement for content that, depending on a viewer's access rights (e.g., for subscription programming), is currently available for viewing, will be available for viewing in the future, or may never become available for viewing, and may correspond to or be unrelated to one or more of the content listings in grid 102. Advertisement 124 may also be for products or services related or unrelated to the content displayed in grid 102. Advertisement 124 may be selectable and provide further information about content, provide information about a product or a service, enable purchasing of content, a product, or a service, provide content relating to the advertisement, etc. Advertisement 124 may be targeted based on a user's profile/preferences, monitored user activity, the type of display provided, or on other suitable targeted advertisement bases.

While advertisement 124 is shown as rectangular or banner shaped, advertisements may be provided in any suitable size, shape, and location in a guidance application display. For example, advertisement 124 may be provided as a rectangular shape that is horizontally adjacent to grid 102. This is sometimes referred to as a panel advertisement. In addition, advertisements may be overlaid over content or a guidance application display or embedded within a display. Advertisements may also include text, images, rotating images, video clips, or other types of content described above. Advertisements may be stored in a user equipment device having a guidance application, in a database connected to the user equipment, in a remote location (including streaming media servers), or on other storage means, or a combination of these locations. Providing advertisements in a media guidance application is discussed in greater detail in, for example, Knudson et al., U.S. Patent Application Publication No. 2003/0110499, filed Jan. 17, 2003; Ward, III et al. U.S. Pat. No. 6,756,997, issued Jun. 29, 2004; and Schein et al. U.S. Pat. No. 6,388,714, issued May 14, 2002, which are hereby incorporated by reference herein in their entireties. It will be appreciated that advertisements may be included in other media guidance application display screens of the embodiments described herein.

Options region 126 may allow the user to access different types of content, media guidance application displays, and/or media guidance application features. Options region 126 may be part of display 100 (and other display screens described herein), or may be invoked by a user by selecting an on-screen option or pressing a dedicated or assignable button on a user input device. The selectable options within options region 126 may concern features related to program listings in grid 102 or may include options available from a main menu display. Features related to program listings may include searching for other airtimes or ways of receiving a program, recording a program, enabling series recording of a program, setting program and/or channel as a favorite, purchasing a program, sorting program listings based on playback information, or other features. Options available from a main menu display may include search options, VOD options (e.g., fast-access playback operations), parental control options, Internet options, cloud-based options, device synchronization options, options to view recently watched media assets, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other websites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. The user profile information may include identifiers of one or more social networks or blogs the user is associated with. For each social network or blog, a username and password (e.g., log-in information) may be stored in the user profile information. Control circuitry 304 may utilize this information in the user profile to automatically access the social network or blog to post or transmit information/content/segments to or retrieve information/contents/segments from the social network or blog. This type of user experience is described in greater detail below in connection with FIG. 4. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

As used herein, a "social network," refers to a platform that facilitates networking and/or social relations among people who, for example, share interests, activities, backgrounds, and/or real-life connections. In some cases, social networks may facilitate communication between multiple user devices (e.g., computers, televisions, smartphones, tablets, etc.) associated with different users by exchanging content from one device to another via a social media server. As used herein, a "social media server" refers to a computer server that facilitates a social network. For example, a social media server owned/operated/used by social media provider may make content (e.g., status updates, microblog posts, images, graphic messages, etc.) associated with a first user accessible to a second user that is within the same social network as the first user.

Another display arrangement for providing media guidance is shown in FIG. 2. Video mosaic display 200 includes selectable options 202 for content information organized based on content type, playback information, genre, and/or other organization criteria. In display 200, television listings option 204 is selected, thus providing listings 206, 208, 210, and 212 as broadcast program listings. In display 200 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 208 may include more than one portion, including media portion 214 and text portion 216. Media portion 214 and/or text portion 216 may be selectable to view content in full-screen or to view information related to the content displayed in media portion 214 (e.g., to view listings for the channel that the video is displayed on).

The listings in display 200 are of different sizes (i.e., listing 206 is larger than listings 208, 210, and 212), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Dec. 29, 2005, which is hereby incorporated by reference herein in its entirety.

Figure 3:
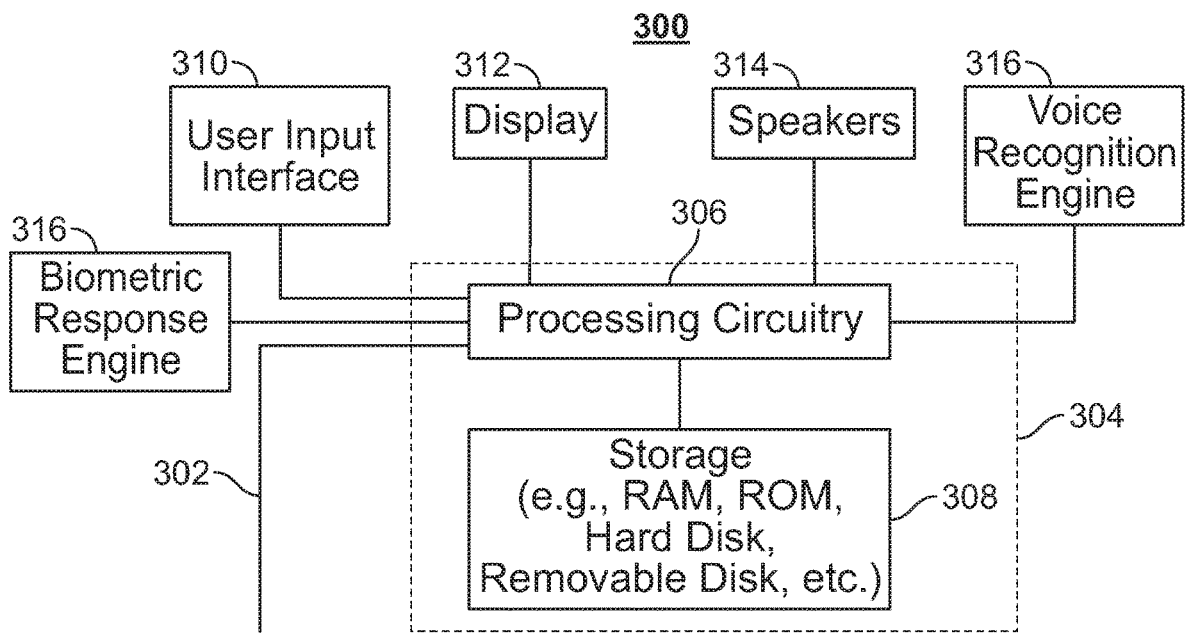
FIG. 3 shows an illustrative user equipment device in accordance with another embodiment of the invention.

Users may access content and the media guidance application (and its display screens described above and below) from one or more of their user equipment devices. FIG. 3 shows a generalized embodiment of illustrative user equipment device 300. More specific implementations of user equipment devices are discussed below in connection with FIG. 4. User equipment device 300 may receive content and data via input/output (hereinafter "I/O") path 302. I/O path 302 may provide content (e.g., broadcast programming, on-demand programming, Internet content, content available over a local area network (LAN) or wide area network (WAN), and/or other content) and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths, but are shown as a single path in FIG. 3 to avoid overcomplicating the drawing.

In some embodiments, a viewing history may be stored in storage 308 for one or more users. The viewing history may be stored locally in storage 308 or on a remote server. The viewing history may include indications of which media assets have been viewed by a given user. The viewing history may also include, for each media asset, which portion or portions have or have not been viewed by the user. In some implementations, the viewing history may include indications of which users in a group of users have seen or viewed a media asset or a particular segment of a media asset. The viewing history may include playback information associated with a given media asset for each of a group or plurality of users. The group of users may be users in a certain geographical location (e.g., in the same home), users that are associated with each other on a social network, or any set of users that have ever accessed the media asset. In some implementations, viewing history stored in storage 308 may indicate that a particular user has "viewed" the media asset only after the user has viewed a substantial portion of the media asset (e.g., more than fifty percent of the media asset or more than a threshold amount of the media asset).

In some embodiments, the viewing history may include, for each user, data that identifies media asset consumption of a particular media asset. Specifically, the viewing history may include, for each user, an indication of the percentage of the media asset the respective user has viewed. The viewing history may include positions at which a fast-access playback operation was performed by each user. The viewing history may include duration of each fast-access playback operation, criteria of content presented while the fast-access playback operation was performed, or any combination thereof. For example, the viewing history may indicate the percentage or duration of the playback operation that took place while an advertisement was being presented or content of a particular type or genre was being presented.

In some embodiments, the viewing history may include a representative percentage of viewing of a particular media asset. The representative percentage may collectively represent the viewing percentage of each user who previously viewed a given media asset. In some implementations, the representative percentage may be an average or weighted average of all the viewing percentages of each user who previously viewed the media asset or viewed some portion of the media asset.

In some embodiments, the viewing history may include a representation of the total number of fast-access playback operations performed by users who previously viewed a particular media asset. The representation may collectively represent the total number of fast-access playback operations performed by each user who previously viewed a given media asset. In some implementations, the representation may be an average or weighted average of the number of fast-access playback operations performed by each user who previously viewed the media asset or viewed some portion of the media asset. In some implementations, the representation may be subdivided or separately represent each the number of each type of fast-access playback operations performed. For example, the viewing history may include a first indication of the representative number of fast-forward operations performed by the group of users who previously viewed the media asset and a second indication of the representative number of rewind operations performed by the group of users who previously viewed the media asset. For example, the viewing history may include an indication of the representative number of repeat viewing operations (e.g., repeating viewing of the media asset from the beginning) performed by the group of users who previously viewed the media asset.

Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 304 executes instructions for a media guidance application stored in memory (i.e., storage 308). Specifically, control circuitry 304 may be instructed by the media guidance application to perform the functions discussed above and below. For example, the media guidance application may provide instructions to control circuitry 304 to generate the media guidance displays. In some implementations, any action performed by control circuitry 304 may be based on instructions received from the media guidance application.

In some embodiments, control circuitry 304 may include voice or verbal input processing circuitry, such as a voice recognition engine 316. This voice or verbal input processing circuitry may include any interface that performs a voice recognition process. Control circuitry 304 may continuously or periodically access the microphone of user input interface 310 to detect the presence of voice input. Upon detecting voice input, control circuitry 304 may utilize voice recognition engine 316 (implemented in software or with dedicated circuitry) to identify who the user is who provided the verbal input.

In some embodiments, control circuitry 304 may include a biometric response engine 318. Biometric response engine 318 may include circuitry that remotely or directly monitors a user's physiological and physical responses to content being presented. For example, biometric response engine 318 may include a heart pulse rate monitor, facial expression or position detection circuitry, eye movement and position detection circuitry, breathing pattern detection circuitry, user position and orientation detection circuitry, and/or any combination thereof. Control circuitry 304 may continuously or periodically access biometric response engine 318 to detect any changes (or interest) in physiological and/or physical attributes of a user at or during specified sections of a media content being presented. Upon detecting a change in the biometric response of the user (e.g., indicating change in interest), control circuitry 304 may utilize a biometric response database to identify who the user associated with the biometric response.

In client-server-based embodiments, control circuitry 304 may include communications circuitry suitable for communicating with a guidance application server or other networks or servers. The instructions for carrying out the above-mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which are described in more detail in connection with FIG. 4). In addition, communications circuitry may include circuitry that enables peer-to-peer communication of user equipment devices, or communication of user equipment devices in locations remote from each other (described in more detail below).

Memory may be an electronic storage device provided as storage 308 that is part of control circuitry 304. As referred to herein, the phrase "electronic storage device," "storage circuitry," or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 308 may be used to store various types of content described herein as well as media guidance data and guidance application data that are described above. Nonvolatile memory may also be used (e.g., to launch a boot-up routine and other instructions). Cloud-based storage, described in relation to FIG. 4, may be used to supplement storage 308 or instead of storage 308.

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and downconverting content into the preferred output format of the user equipment 300. Control circuitry 304 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may send instructions to control circuitry 304 using user input interface 310. User input interface 310 may be any suitable user interface, such as a remote control, mouse, trackball, keypad, keyboard, microphone, touch screen, touchpad, stylus input, joystick, voice recognition interface, or other user input interfaces. User input interface 310 may include keys or displayed options that enable a user to instruct control circuitry 304 to sort media assets based on playback information. Display 312 may be provided as a stand-alone device or integrated with other elements of user equipment device 300. Display 312 may be one or more of a monitor, a television, a liquid crystal display (LCD) for a mobile device, or any other suitable equipment for displaying visual images. For example, display 312 may be a touchscreen or touch-sensitive display. In such circumstances, user input interface 312 may be integrated with or combined with display 312. Display 312 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 312 may be HDTV-capable. In some embodiments, display 312 may be a 3D display, and the interactive media guidance application and any suitable content may be displayed in 3D. A video card or graphics card may generate the output to the display 312. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 304. The video card may be integrated with the control circuitry 304. Speakers 314 may be provided as integrated with other elements of user equipment device 300 or may be stand-alone units. The audio component of videos and other content displayed on display 312 may be played through speakers 314. In some embodiments, the audio may be distributed to a receiver (not shown), which processes and outputs the audio via speakers 314.

The guidance application may be implemented using any suitable architecture. For example, it may be a stand-alone application wholly implemented on user equipment device 300. In such an approach, instructions of the application are stored locally (e.g., in storage 308), and data for use by the application is downloaded on a periodic basis (e.g., from an out-of-band feed, from an Internet resource, or using another suitable approach). Control circuitry 304 may retrieve instructions of the application from storage 308 and process the instructions to generate any of the displays discussed herein. Based on the processed instructions, control circuitry 304 may determine what action to perform when input is received from input interface 310. For example, movement of a cursor on a display up/down may be indicated by the processed instructions when input interface 310 indicates that an up/down button was selected.

In some embodiments, the media guidance application is a client-server based application. Data for use by a thick or thin client implemented on user equipment device 300 is retrieved on-demand by issuing requests to a server remote to the user equipment device 300. In one example of a client-server based guidance application, control circuitry 304 runs a web browser that interprets web pages provided by a remote server. For example, the remote server may store the instructions for the application in a storage device. The remote server may process the stored instructions using circuitry (e.g., control circuitry 304) and generate the displays discussed above and below. The client device may receive the displays generated by the remote server and may display the content of the displays locally on equipment device 300. This way, the processing of the instructions is performed remotely by the server while the resulting displays are provided locally on equipment device 300. Equipment device 300 may receive inputs from the user via input interface 310 and transmit those inputs to the remote server for processing and generating the corresponding displays. For example, equipment device 300 may transmit a communication to the remote server indicating that an up/down button was selected via input interface 310. The remote server may process instructions in accordance with that input and generate a display of the application corresponding to the input (e.g., a display that moves a cursor up/down). The generated display is then transmitted to equipment device 300 for presentation to the user.

In some embodiments, the media guidance application is downloaded and interpreted or otherwise run by an interpreter or virtual machine (run by control circuitry 304). In some embodiments, the guidance application may be encoded in the ETV Binary Interchange Format (EBIF), received by control circuitry 304 as part of a suitable feed, and interpreted by a user agent running on control circuitry 304. For example, the guidance application may be an EBIF application. In some embodiments, the guidance application may be defined by a series of JAVA-based files that are received and run by a local virtual machine or other suitable middleware executed by control circuitry 304. In some of such embodiments (e.g., those employing MPEG-2 or other digital media encoding schemes), the guidance application may be, for example, encoded and transmitted in an MPEG-2 object carousel with the MPEG audio and video packets of a program.

Figure 4:
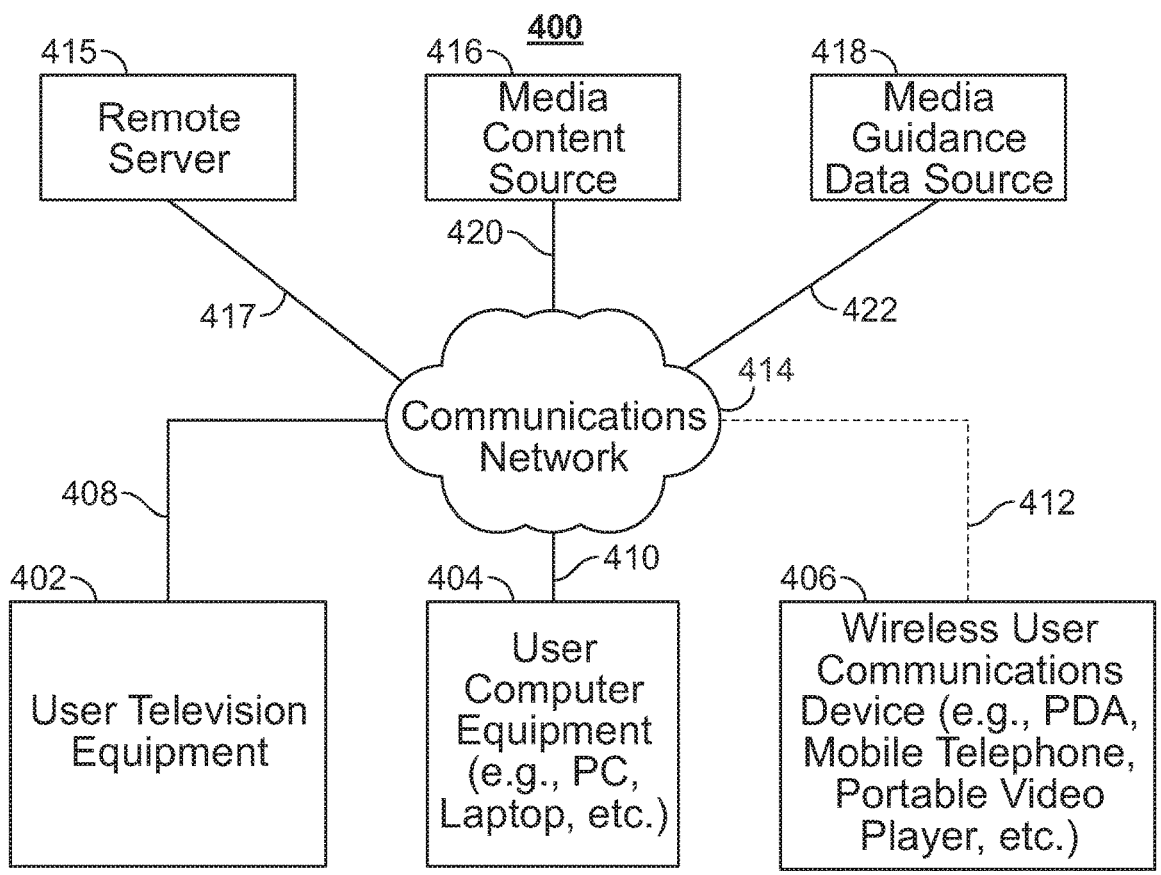
FIG. 4 is a diagram of an illustrative cross-platform interactive media system in accordance with another embodiment of the invention.

User equipment device 300 of FIG. 3 can be implemented in system 400 of FIG. 4 as user television equipment 402, user computer equipment 404, wireless user communications device 406, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a stand-alone device or may be part of a network of devices. Various network configurations of devices may be implemented and are discussed in more detail below.

A user equipment device utilizing at least some of the system features described above in connection with FIG. 3 may not be classified solely as user television equipment 402, user computer equipment 404, or a wireless user communications device 406. For example, user television equipment 402 may, like some user computer equipment 404, be Internet-enabled allowing for access to Internet content, while user computer equipment 404 may, like some television equipment 402, include a tuner allowing for access to television programming. The media guidance application may have the same layout on various different types of user equipment or may be tailored to the display capabilities of the user equipment. For example, on user computer equipment 404, the guidance application may be provided as a website accessed by a web browser. In another example, the guidance application may be scaled down for wireless user communications devices 406.

In system 400, there is typically more than one of each type of user equipment device but only one of each is shown in FIG. 4 to avoid overcomplicating the drawing. In addition, each user may utilize more than one type of user equipment device and also more than one of each type of user equipment device.

In some embodiments, a user equipment device (e.g., user television equipment 402, user computer equipment 404, wireless user communications device 406) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device (e.g., remote from the first device).

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the website www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 414. Namely, user television equipment 402, user computer equipment 404, and wireless user communications device 406 are coupled to communications network 414 via communications paths 408, 410, and 412, respectively. Each user of the user equipment devices may be associated with different users in a crowd of users. Communications network 414 may be one or more networks including the Internet, a mobile phone network, mobile voice or data network (e.g., a 3G, 4G or LTE network), cable network, public switched telephone network, or other types of communications network or combinations of communications networks. Paths 408, 410, and 412 may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. Path 412 is drawn with dotted lines to indicate that in the exemplary embodiment shown in FIG. 4 it is a wireless path and paths 408 and 410 are drawn as solid lines to indicate they are wired paths (although these paths may be wireless paths, if desired). Communications with the user equipment devices may be provided by one or more of these communications paths, but are shown as a single path in FIG. 4 to avoid overcomplicating the drawing.

Although communications paths are not drawn between user equipment devices, these devices may communicate directly with each other via communication paths, such as those described above in connection with paths 408, 410, and 412, as well as other short-range point-to-point communication paths, such as USB cables, IEEE 1394 cables, wireless paths (e.g., Bluetooth, Near Field Communications (NFC), infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 414.

System 400 includes content source 416 and media guidance data source 418 coupled to communications network 414 via communication paths 420 and 422, respectively. Paths 420 and 422 may include any of the communication paths described above in connection with paths 408, 410, and 412. Communications with the content source 416 and media guidance data source 418 may be exchanged over one or more communications paths, but are shown as a single path in FIG. 4 to avoid overcomplicating the drawing. In addition, there may be more than one of each of content source 416 and media guidance data source 418, but only one of each is shown in FIG. 4 to avoid overcomplicating the drawing. (The different types of each of these sources are discussed below.) If desired, content source 416 and media guidance data source 418 may be integrated as one source device. Although communications between sources 416 and 418 with user equipment devices 402, 404, and 406 are shown as through communications network 414, in some embodiments, sources 416 and 418 may communicate directly with user equipment devices 402, 404, and 406 via communication paths (not shown) such as those described above in connection with paths 408, 410, and 412.

Content source 416 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 416 may be the originator of content (e.g., a television broadcaster, a Webcast provider, etc.) or may not be the originator of content (e.g., an on-demand content provider, an Internet provider of content of broadcast programs for downloading, etc.). Content source 416 may include cable sources, satellite providers, on-demand providers, Internet providers, over-the-top content providers, or other providers of content. Content source 416 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 418 may provide media guidance data, such as the media guidance data described above. Media guidance application data may be provided to the user equipment devices using any suitable approach. In some embodiments, the guidance application may be a stand-alone interactive television program guide that receives program guide data via a data feed (e.g., a continuous feed or trickle feed).

Program schedule data and other guidance data may be provided to the user equipment on a television channel sideband, using an in-band digital signal, using an out-of-band digital signal, or any other suitable data transmission technique. Program schedule data and other media guidance data may be provided to user equipment on multiple analog or digital television channels.

In some embodiments, guidance data from media guidance data source 418 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 418 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 418 may provide user equipment devices 402, 404, and 406 the media guidance application itself or software updates for the media guidance application.

Media guidance applications may be, for example, stand-alone applications implemented on user equipment devices. For example, the media guidance application may be implemented as software or a set of executable instructions which may be stored in storage 308, and executed by control circuitry 304 of a user equipment device 300. In some embodiments, media guidance applications may be client-server applications where only a client application resides on the user equipment device, and server application resides on a remote server. For example, media guidance applications may be implemented partially as a client application on control circuitry 304 of user equipment device 300 and partially on a remote server as a server application (e.g., media guidance data source 418) running on control circuitry of remote server 415. When executed by control circuitry of remote server 415 (such as media guidance data source 418), the media guidance application may instruct the control circuitry to generate the guidance application displays and transmit the generated displays to the user equipment devices. The server application may instruct the control circuitry of the media guidance data source 418 to transmit data for storage on the user equipment. The client application may instruct control circuitry of the receiving user equipment to generate the guidance application displays.

Content and/or media guidance data delivered to user equipment devices 402, 404, and 406 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 400 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 4.

In one approach, user equipment devices may communicate with each other within a home network. User equipment devices can communicate with each other directly via short-range point-to-point communication schemes described above, via indirect paths through a hub or other similar device provided on a home network, or via communications network 414. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. patent application Ser. No. 11/179,410, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 416 to access content. Specifically, within a home, users of user television equipment 402 and user computer equipment 404 may access the media guidance application to navigate among and locate desirable content. Users may also access the media guidance application outside of the home using wireless user communications devices 406 to navigate among and locate desirable content.

In a fourth approach, user equipment devices may operate in a cloud computing environment to access cloud services. In a cloud computing environment, various types of computing services for content sharing, storage or distribution (e.g., video sharing sites, blogs, news sites, or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 414. These cloud resources may include one or more content sources 416 and one or more media guidance data sources 418. In addition or in the alternative, the remote computing sites may include other user equipment devices, such as user television equipment 402, user computer equipment 404, and wireless user communications device 406. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, access to messages posted by users in a crowd, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 404 or wireless user communications device 406 having content capture feature. Alternatively, the user can first transfer the content to a user equipment device, such as user computer equipment 404. The user equipment device storing the content uploads the content to the cloud using a data transmission service on communications network 414. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 3.

In some embodiments, the media guidance application may sort or organize media content based on playback information. For example, the media guidance application may present listings for media assets that are sorted according to a representative percentage of the corresponding media assets that was viewed by other users. In some implementations, the media guidance application may present listings for media assets that are sorted according to a representative number or type of fast-access playback operation(s) performed by users who previously viewed the corresponding media assets.

FIG. 5 shows an illustrative display of a screen 500 for sorting media assets based on playback information in accordance with an embodiment of the invention. Screen 500 may include a sorted media asset region 510, organize by number of fast-access playback operations option 560, organize by percentage viewed option 570 and organize by type of fast-access playback operation option 580. Sorted media asset region 510 may include a plurality of media asset listings. Region 510 may include, for each media asset listing, a corresponding rank in rank region 520, media asset identifier (e.g., title) in identifier region 530, average or representative percentage viewed in first playback information region 540, and a representative number or type of fast-access playback operations performed in second playback information region 550.

Rank 520 may identify the position of the corresponding media asset relative to the other media assets that are presented in the sort based on the representative percentage of the media asset that was viewed. Specifically, in response to receiving an instruction from a first user to present media asset identifiers based on percentage viewed, the media guidance application may select a plurality of media assets to analyze. For example, the media guidance application may select a plurality of media assets to analyze in response to receiving a user selection of option 570. The plurality of media assets may be selected based on any criterion or criteria (e.g., number of media asset listings that can be simultaneously presented on a display of user equipment 300, most popular, media assets that match a profile of the first user, media assets that do not match a profile of the first user, media assets that have been recommended to the user by friends of the user on a social network, or any combination thereof). The media guidance application may retrieve a viewing history for each media asset in the plurality. The viewing history may identify each of a plurality of users that has previously accessed the corresponding media asset. For example, the media asset may retrieve a viewing history that identifies users that previously viewed a first media asset (e.g., Seinfeld) and that identifies users that previously viewed a second media asset (e.g., Friends).

The media guidance application may select a subset of users that are identified in the viewing history as having viewed the corresponding media assets. The subset of users may be selected based on those users that are friends of the first user on a social network, those users that are within a geographical proximity to the first user (e.g., within the same state or city or household), those users that share a common interest with the first user (e.g., have similar demographic attributes as the first user or have similar user profiles as the first user). In some implementations, the media guidance application may select all users that are identified in the viewing history as having viewed the corresponding media assets regardless of any relationship to the first user they have.

In some implementations, the media guidance application may retrieve playback information for each user that is selected. The playback information may indicate the percentage of the media asset that the user has viewed. For example, the media guidance application may retrieve from the viewing history the percentage of the first media asset (e.g., Seinfeld) viewed by a second user (e.g., 70%) and the percentage of the first media asset (e.g., Seinfeld) viewed by a third user (e.g., 76%). The percentage of the media asset that was viewed by a given user may be more or less than 100 percent based on when the given user start playing the media asset, stopped playing the media asset, and whether the user performed any fast-access playback operations while viewing the media asset. The process used by the media guidance application to compute the percentage of the media asset that was viewed for each user is discussed in detail below in connection with FIG. 6.

The media guidance application may combine the retrieved percentage values for each user to compute a representative percentage of the media asset that was viewed by the selected users. For example, the media guidance application may compute an average or weighted average of the retrieved percentage values to compute a representative percentage of the media asset that was viewed by the selected users. The media guidance application may combine the retrieved percentage values using any other mathematical operation or function to compute the representative percentage of the media asset that was viewed by the selected users.

The media guidance application may repeat the computation of a representative percentage of the media asset viewed for each media asset that is selected. For example, the media guidance application may retrieve from the viewing history the percentage of the second media asset (e.g., Friends) viewed by a fourth user (e.g., 60%) and the percentage of the second media asset (e.g., Friends) viewed by a fifth user (e.g., 66%). In some circumstances, the same user may have viewed more than one of the media assets that the media guidance application selected. For example, the fourth user may be the same user as the second user. Based on these percentages retrieved from the second media asset, the media guidance application may compute a representative percentage of the media asset that was viewed by the selected users.

In some embodiments, the media guidance application may rank each selected media asset based on the corresponding representative percentage viewed that was computed. For example, the media guidance application may assign the highest rank to the media asset associated with the highest representative percentage viewed and the lowest rank to the media asset associated with the lowest representative percentage viewed. Alternatively, the media guidance application may assign the lowest rank to the media asset associated with the highest representative percentage viewed and the highest rank to the media asset associated with the lowest representative percentage viewed. The media guidance application may sort the media assets based on the assigned rank. The media assets may be organized such that the media asset associated with the highest rank is positioned first in a list and the media asset associated with the lowest rank is positioned last in the list.

In some embodiments, rank 520 may identify the position of the corresponding media asset relative to the other media assets that are presented in the sort based on the number of fast-access playback operations that were performed. Specifically, in response to receiving an instruction from a first user to present media asset identifiers based on fast-access playback operations that were performed by other users, the media guidance application may select a plurality of media assets to analyze. For example, the media guidance application may select a plurality of media assets to analyze in response to receiving a user selection of option 560. The plurality of media assets may be selected based on any criterion or criteria (e.g., number of media asset listings that can be simultaneously presented on a display of user equipment 300, most popular, media assets that match a profile of the first user, media assets that do not match a profile of the first user, media assets that have been recommended to the user by friends of the user on a social network, or any combination thereof). The media guidance application may retrieve a viewing history for each media asset in the plurality. The viewing history may identify each of a plurality of users that has previously accessed the corresponding media asset. For example, the media asset may retrieve a viewing history that identifies users that previously viewed a first media asset (e.g., Seinfeld) and that identifies users that previously viewed a second media asset (e.g., Friends).

The media guidance application may select a subset of users that are identified in the viewing history as having viewed the corresponding media assets. The subset of users may be selected based on those users that are friends of the first user on a social network, those users that are within a geographical proximity to the first user (e.g., within the same state or city or household), those users that share a common interest with the first user (e.g., have similar demographic attributes as the first user or have similar user profiles as the first user). In some implementations, the media guidance application may select all users that are identified in the viewing history as having viewed the corresponding media assets regardless of any relationship to the first user they have.

In some implementations, the media guidance application may retrieve playback information for each user that is selected. The playback information may indicate the number of fast-access playback operations performed (or requested to be performed) by each selected user while the selected user viewed the selected media asset. For example, the media guidance application may retrieve from the viewing history the number of playback operations a second user performed while viewing the first media asset (e.g., Seinfeld) and the number of playback operations a third user performed while viewing the first media asset (e.g., Seinfeld). The media guidance application may combine the retrieved number of fast-access playback operations performed for each user to compute a representative number of fast-access playback operations performed by users who viewed the selected media asset. For example, the media guidance application may compute an average or weighted average of the retrieved number of fast-access playback operations performed to compute a representative number of fast-access playback operations performed for the media asset that was viewed by the selected users. The media guidance application may combine the retrieved number of fast-access playback operations using any other mathematical operation or function to compute the representative number of fast-access playback operations performed by the selected users who viewed the media asset.

The media guidance application may repeat the computation of a representative number of fast-access playback operations performed for each media asset that is selected. For example, the media guidance application may retrieve from the viewing history the number of fast-access playback operations performed by a fourth user while viewing the second media asset (e.g., Friends) and the number of fast-access playback operations performed by a fifth user while viewing the second media asset (e.g., Friends). In some circumstances, the same user may have viewed more than one of the media assets that the media guidance application selected. For example, the fourth user may be the same user as the second user. Based on these numbers of fast-access playback operations performed which were retrieved for the second media asset, the media guidance application may compute a representative number of fast-access playback operations performed.

In some embodiments, the media guidance application may rank each selected media asset based on the corresponding representative number of fast-access playback operations performed that was computed. For example, the media guidance application may assign the highest rank to the media asset associated with the highest representative number of fast-access playback operations performed and the lowest rank to the media asset associated with the lowest representative number of fast-access playback operations performed. Alternatively, the media guidance application may assign the lowest rank to the media asset associated with the highest representative number of fast-access playback operations performed and the highest rank to the media asset associated with the lowest representative number of fast-access playback operations performed. The media guidance application may sort the media assets based on the assigned rank. The media assets may be organized such that the media asset associated with the highest rank is positioned first in a list and the media asset associated with the lowest rank is positioned last in the list.

In some embodiments, rank 520 may identify the position of the corresponding media asset relative to the other media assets that are presented in the sort based on the type or types of fast-access playback operations that were performed. Specifically, in response to receiving an instruction from a first user to present media asset identifiers based on the type or types of fast-access playback operations that were performed by other users, the media guidance application may select a plurality of media assets to analyze. For example, the media guidance application may select a plurality of media assets to analyze in response to receiving a user selection of option 580 and in response to receiving a user selection of type option 582 (e.g., fast-forward type of operation or rewind type of operation). The plurality of media assets may be selected based on any criterion or criteria (e.g., number of media asset listing that can be simultaneously presented on a display of user equipment 300, most popular, media assets that match a profile of the first user, media assets that do not match a profile of the first user, media assets that have been recommended to the user by friends of the user on a social network, or any combination thereof). The media guidance application may retrieve a viewing history for each media asset in the plurality. The viewing history may identify each of a plurality of users that has previously accessed the corresponding media asset. For example, the media asset may retrieve a viewing history that identifies users that previously viewed a first media asset (e.g., Seinfeld) and that identifies users that previously viewed a second media asset (e.g., Friends).

The media guidance application may select a subset of users that are identified in the viewing history as having viewed the corresponding media assets. The subset of users may be selected based on those users that are friends of the first user on a social network, those users that are within a geographical proximity to the first user (e.g., within the same state or city or household), those users that share a common interest with the first user (e.g., have similar demographic attributes as the first user or have similar user profiles as the first user). In some implementations, the media guidance application may select all users that are identified in the viewing history as having viewed the corresponding media assets regardless of any relationship to the first user they have.

In some implementations, the media guidance application may retrieve playback information for each user that is selected. The playback information may indicate the type of fast-access playback operations performed (or requested to be performed) by each selected user while the selected user viewed the selected media asset. For example, the media guidance application may retrieve from the viewing history the number of fast-access playback operations a second user performed of a particular type (e.g., fast-forward operations) while viewing the first media asset (e.g., Seinfeld) and the number of playback operations of a particular type (e.g., fast-forward operations) a third user performed while viewing the first media asset (e.g., Seinfeld). The media guidance application may combine the retrieved number of fast-access playback operations of the particular type performed for each user to compute a representative number of fast-access playback operations of the particular type performed by users who viewed the selected media asset. For example, the media guidance application may compute an average or weighted average of the retrieved number of fast-access playback operations of the particular type performed to compute a representative number of fast-access playback operations of the particular type performed for the media asset that was viewed by the selected users. The media guidance application may combine the retrieved number of fast-access playback operations of the particular type using any other mathematical operation or function to compute the representative number of fast-access playback operations of the particular type performed by the selected users who viewed the media asset.

The media guidance application may repeat the computation of a representative number of fast-access playback operations of the particular type performed for each media asset that is selected. For example, the media guidance application may retrieve from the viewing history the number of fast-access playback operations of the particular type performed by a fourth user while viewing the second media asset (e.g., Friends) and the number of fast-access playback operations of the particular type performed by a fifth user while viewing the second media asset (e.g., Friends). In some circumstances, the same user may have viewed more than one of the media assets that the media guidance application selected. For example, the fourth user may be the same user as the second user. Based on these numbers of fast-access playback operations of the particular type performed that were retrieved for the second media asset, the media guidance application may compute a representative number of fast-access playback operations of the particular type performed.

In some embodiments, the media guidance application may rank each selected media asset based on the corresponding representative number of fast-access playback operations of the particular type performed that was computed (e.g., the type selected in option 582). For example, the media guidance application may assign the highest rank to the media asset associated with the highest representative number of fast-access playback operations of the particular type performed and the lowest rank to the media asset associated with the lowest representative number of fast-access playback operations of the particular type performed. Alternatively, the media guidance application may assign the lowest rank to the media asset associated with the highest representative number of fast-access playback operations performed and the highest rank to the media asset associated with the lowest representative number of fast-access playback operations performed. The media guidance application may sort the media assets based on the assigned rank. The media assets may be organized such that the media asset associated with the highest rank is positioned first in a list and the media asset associated with the lowest rank is positioned last in the list.

In some embodiments, the media guidance application may retrieve media asset listings or identifiers associated with the selected media assets. The media guidance application may order or sort the media asset listings based on the organization of the corresponding selected media assets in the list. The media guidance application may present the sorted media asset listings in region 510. The media guidance application may include a title of each media asset listing in identifier region 530 and a corresponding rank of each media asset in rank region 520. In some implementations, the representative percentage viewed computed for each media asset may be presented by the media guidance application next to or adjacent to the corresponding media asset identifier in first playback information region 540.

In some embodiments, the media guidance application may include a representative number of fast-access playback operations that were performed corresponding to each media asset in region 550. Specifically, the media guidance application may retrieve the computed representative number of fast-access playback operations performed by other users and present this number in region 550 for every asset or some media assets identified in region 510. In some embodiments, the representative number of fast-access playback operations presented in region 550 may be interactive. In particular, in response to receiving a user selection of one of the representative numbers (e.g., the number 3 corresponding to the media asset "Family Guy"), the media guidance application may present a fast-access playback operation type window 552. Window 552 may identify the representative number of each type of fast-access playback operations performed by the selected users.

For example, the representative number of fast-access playback operations presented in region 550 may correspond to the total number of fast-access playback operations performed regardless of type. Window 552 may identify each of the types used by the media guidance application to arrive at the total number of fast-access playback operations shown in region 550. Specifically, the media guidance application may determine that an average of two fast-forward operations were performed by users who viewed the media asset "Family Guy" and that one rewind operation was performed by users who viewed the media asset "Family Guy". Accordingly, the media guidance application may present the total number of fast-access playback operations for the media asset "Family Guy" as the number three and in window 552 may present the breakdown of the total number by type of fast-access playback operation (e.g., 2 fast-forward and 1 rewind operations).

In some embodiments, the identifiers in identifier region 530 are interactive. In response to receiving a user selection of an identifier in region 530, the media guidance application may provide an option for the user to view or play back the corresponding media asset, record the corresponding media asset, schedule a reminder for the corresponding media asset, purchase the corresponding media asset, or perform any other media guidance application function for the corresponding media asset.

Figure 6:
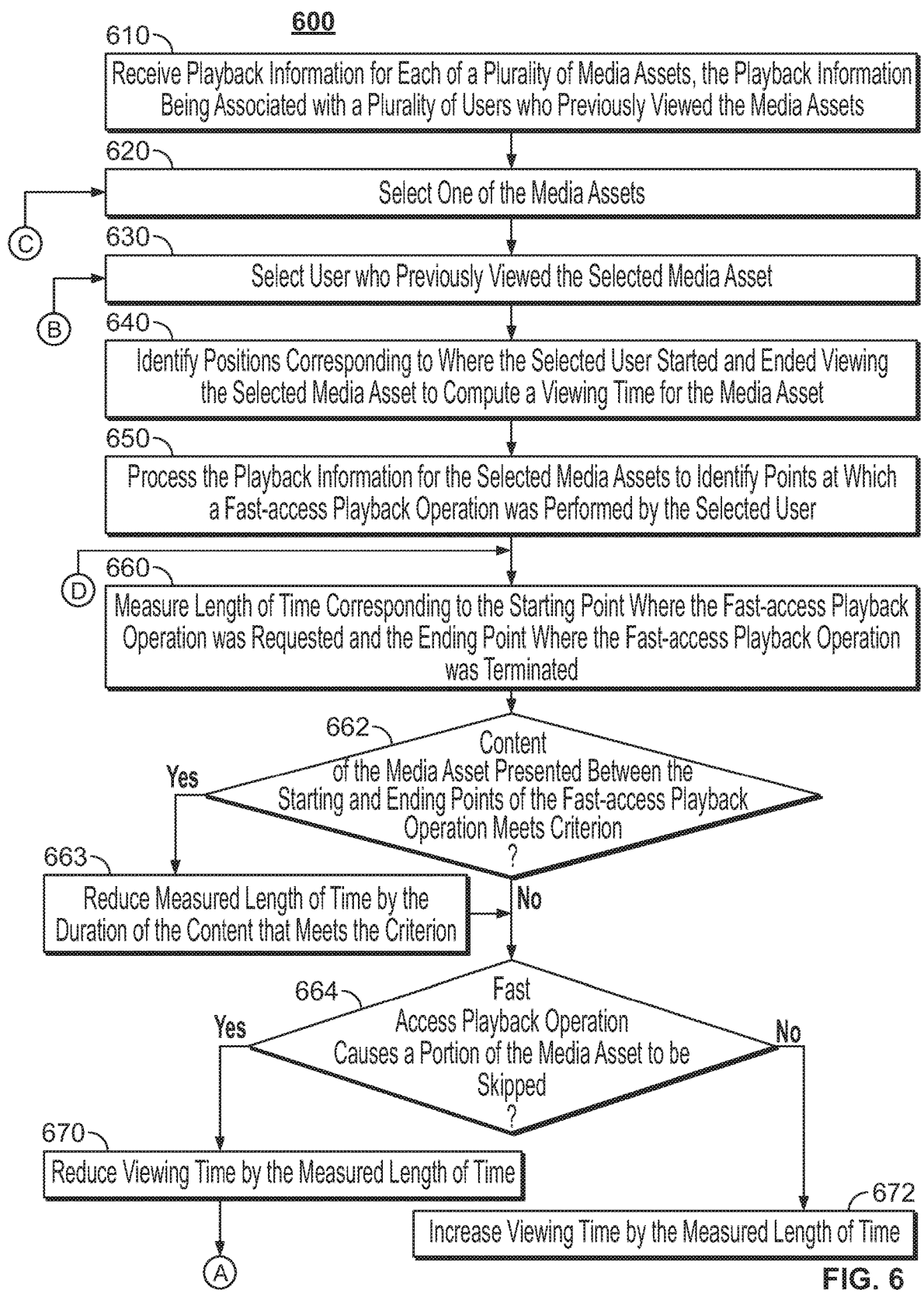
FIGS. 6 and 7 show illustrative flow diagrams of processes for sorting media assets based on playback information in accordance with embodiments of the invention.
Figure 6:
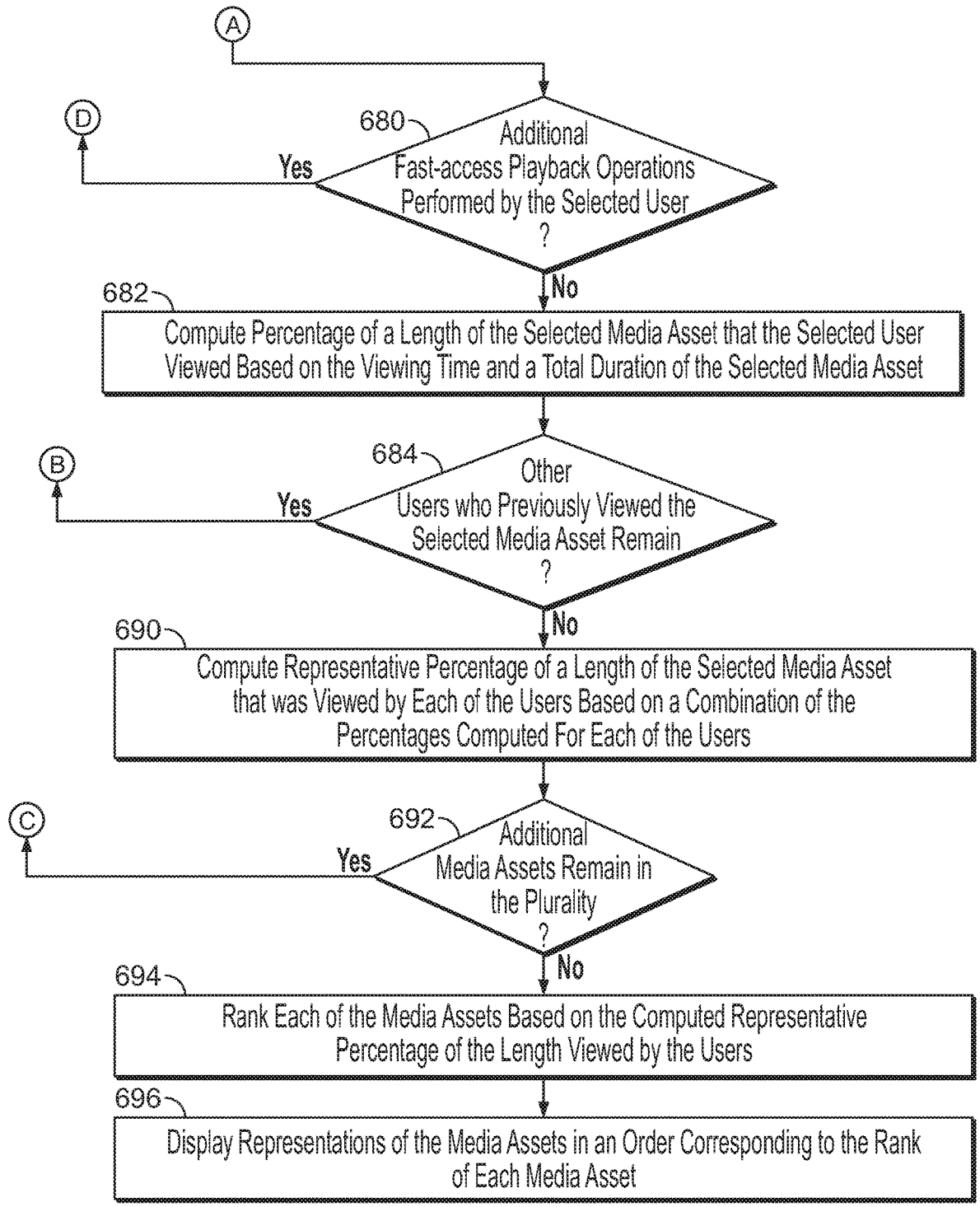

FIG. 6 shows an illustrative flow diagram of a process 600 for sorting media assets based on playback information in accordance with an embodiment of the invention. At step 610, playback information for each of a plurality of media assets is received, the playback information being associated with a plurality of users who previously viewed the media assets. For example, the media guidance application may select a group of media assets. The media guidance application may retrieve from a local or remote database in storage 308, a viewing history for each of the media assets.

At step 620, one of the media assets is selected. For example, the media guidance application may select a first media asset (e.g., Seinfeld) from the group of media assets.

At step 630, a user who previously viewed the selected media asset is selected. For example, the media guidance application may identify a plurality of users who previously viewed the selected media asset. The media guidance application may select one of the identified users.

At step 640, positions corresponding to where the selected user started and ended viewing the selected media asset are identified to compute a viewing time for the media asset. For example, the media guidance application may determine, based on the viewing history of the selected user, when the selected user started viewing the selected media asset (e.g., from the beginning or from some point in the middle) and when the selected user ended viewing the selected media asset (e.g., at the ending point or at some point in the middle of the media asset). For example, the media guidance application may determine that the user started viewing the selected media asset five minutes past the starting point of the media asset and ended viewing the selected media asset ten minutes from the end of the selected media asset. In addition, the media guidance application may determine that the media asset is a total of two hours in length. Accordingly, the media guidance application may determine that the viewing time of the selected media asset for the selected user is one hour and 45 minutes (i.e., two hours minus the first five minutes minus the last ten minutes).

At step 650, the playback information for the selected media assets is processed to identify points at which a fast-access playback operation was performed by the selected user. For example, the media guidance application may determine, based on the viewing history of the selected user, at which points the user requested that a fast-access playback operation be performed.

At step 660, a length of time corresponding to the starting point where the fast-access playback operation was requested and the ending point where the fast-access playback operation was terminated is measured.

At step 662, a determination is made as to whether content of the media asset presented between the starting and ending points of the fast-access playback operation meets a criterion. In response to determining that the content meets the criterion, the process proceeds to step 663, otherwise the process proceeds to step 664. For example, the media guidance application may determine that the user requested to skip over a portion of the media asset between seven minutes past the start time and ten minutes past the start time of the media asset. In addition, the media guidance application may determine that the portion of the media asset between eight minutes and nine minutes past the start time correspond to content meeting a criterion (e.g, a commercial or content being of a particular genre or type).

At step 663, the measured length of time is reduced by the duration of the content that meets the criterion. For example, the media guidance application may determine that the portion of the media asset between eight minutes and nine minutes past the start time corresponds to content meeting a criterion and is one minute in duration. Accordingly, the media guidance application may reduce the amount of time the fast-access playback operation operated on the media asset by the duration of the content meeting the criterion.

At step 664, a determination is made as to whether the fast access playback operation causes a portion of the media asset to be skipped. In response to determining that the operation causes the portion to be skipped, the process proceeds to step 670, otherwise the process proceeds to step 672.

At step 670, the viewing time is reduced by the measured length of time. For example, in the case of a fast-access playback operation that causes a portion to be skipped (e.g., a fast-forward operation), the viewing time of the media asset is reduced by the amount of time the fast-access playback operation skipped the media asset and, optionally, by the amount of time content meeting a criterion was presented during the fast-access operation.

At step 672, the viewing time is increased by the measured length of time. For example, in the case of a fast-access playback operation that causes a portion to be repeated (e.g., a rewind operation), the viewing time of the media asset is increased by the amount of time the fast-access playback operation caused the media asset to be repeated and, optionally, by the amount of time content meeting a criterion was presented during the fast-access operation.

At step 680, a determination is made as to whether any additional fast-access playback operations were performed by the selected user. In response to determining that additional operations were performed, the process proceeds to step 660, otherwise the process proceeds to step 682.

At step 682, the percentage of a length of the selected media asset that the selected user viewed is computed based on the viewing time and a total duration of the selected media asset. For example, the media guidance application may divide the viewing time that is computed by the total duration of the selected media asset. In particular, the total duration of the media asset may be two hours and the computed viewing time may be one hour and 45 minutes. Accordingly, the media guidance application may compute the percentage of the length of the selected media asset to be 87.5% (105 minutes (computed viewing time) divided by 120 minutes (total media asset duration)).

At step 684, a determination is made as to whether other users who previously viewed the selected media asset remain. In response to determining that other users remain, the process proceeds to step 630, otherwise the process proceeds to step 690.

At step 690, a representative percentage of a length of the selected media asset that was viewed by each of the users is computed based on a combination of the percentages computed for each of the users. For example, the media guidance application may compute an average of each of the computed percentages for each user to determine the representative percentage of the length of the media asset that was viewed.

At step 692, a determination is made as to whether other additional media assets remain in the plurality of media assets. In response to determining that additional media assets remain, the process proceeds to step 620, otherwise the process proceeds to step 694.

At step 694, each of the media assets is ranked based on the computed representative percentage of the length viewed by the users.

At step 696, representations of the media assets are displayed in an order corresponding to the rank of each media asset. For example, the media guidance application may present identifiers (e.g., titles) of the corresponding media asset in screen 500 (FIG. 5).

Figure 7:
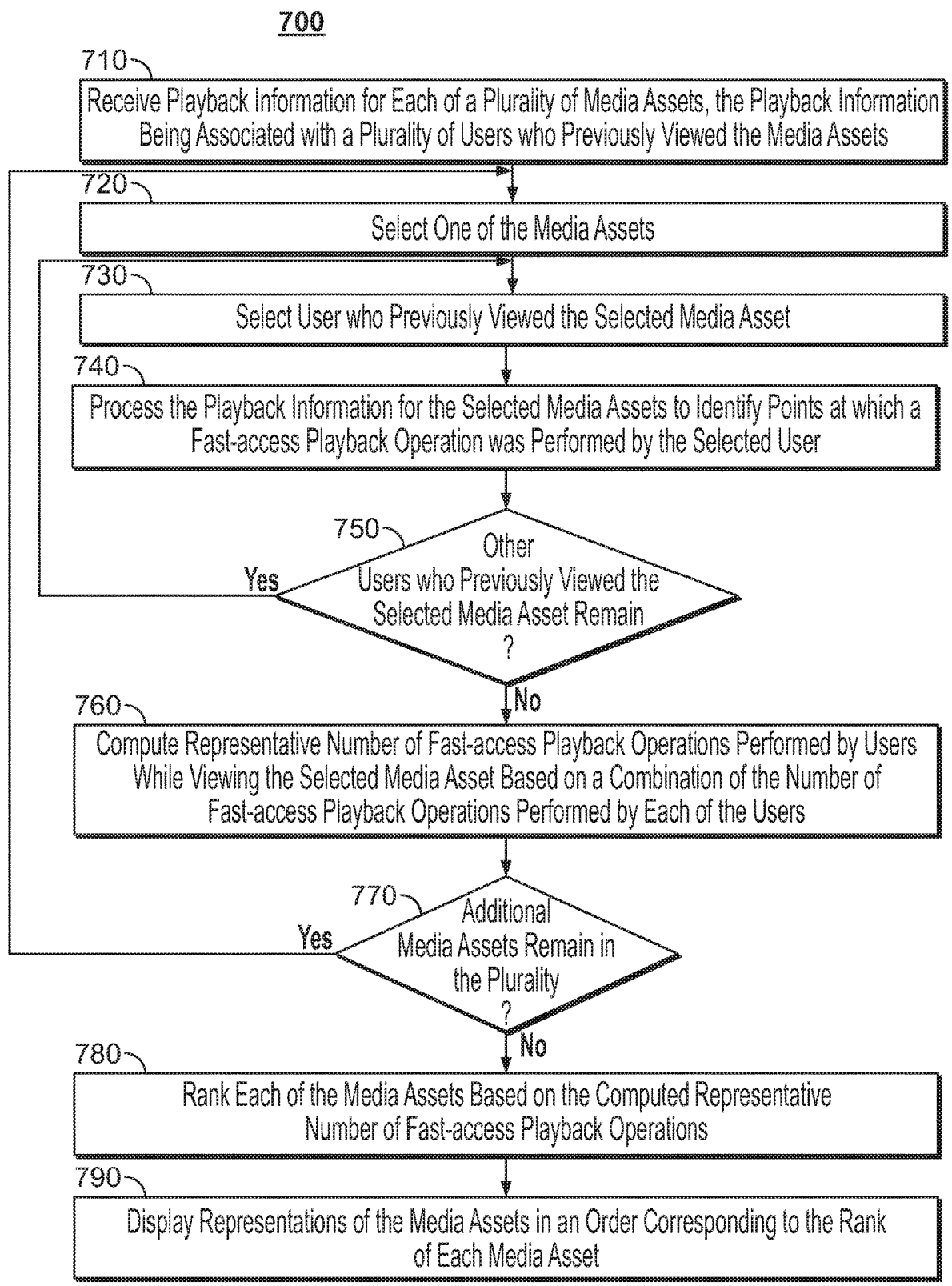

FIG. 7 shows an illustrative flow diagram of a process 700 for sorting media assets based on playback information in accordance with an embodiment of the invention. At step 710, playback information for each of a plurality of media assets is received, the playback information being associated with a plurality of users who previously viewed the media assets. For example, the media guidance application may select a group of media assets. The media guidance application may retrieve from a local or remote database in storage 308, a viewing history for each of the media assets.

At step 720, one of the media assets is selected. For example, the media guidance application may select a first media asset (e.g., Seinfeld) from the group of media assets.

At step 730, a user who previously viewed the selected media asset is selected. For example, the media guidance application may identify a plurality of users who previously viewed the selected media asset. The media guidance application may select one of the identified users.

At step 740, playback information for the selected media assets is processed to identify points at which a fast-access playback operation was performed by the selected user. For example, the media guidance application may retrieve from the viewing history indications of how many fast-access playback operations the user performed while viewing the selected media asset. The media guidance application may also determine the type of fast-access playback operations (e.g., fast-forward or rewind) that the user performed.

At step 750, a determination is made as to whether other users who previously viewed the selected media asset remain. In response to determining that other users remain, the process proceeds to step 730, otherwise the process proceeds to step 760.

At step 760, a representative number of fast-access playback operations performed by users while viewing the selected media asset is computed based on a combination of the number of fast-access playback operations performed by each of the users. For example, the media guidance application may compute an average of the number of fast-access playback operations (regardless of type) performed by each user to determine a representative number of fast-access playback operations for the media asset. In some embodiments, the media guidance application may compute an average of the number of fast-access playback operations of a particular type (e.g., type selected in option 582) performed by each user to determine a representative number of fast-access playback operations of a particular type for the media asset (FIG. 5).

At step 770, a determination is made as to whether other additional media assets remain in the plurality of media assets. In response to determining that additional media assets remain, the process proceeds to step 720, otherwise the process proceeds to step 780.

At step 780, each of the media assets is ranked based on the computed representative number of fast-access playback operations. In some embodiments, the media assets may be ranked based on a representative number of fast-access playback operations of a particular type.

At step 790, representations of the media assets are displayed in an order corresponding to the rank of each media asset. For example, the media guidance application may present identifiers (e.g., titles) of the corresponding media asset in screen 500 (FIG. 5).

It should be understood that the above steps of the flow diagram of FIGS. 6 and 7 may be executed or performed in any order or sequence not limited to the order and sequence shown and described in the figures. Also, some of the above steps of the flow diagrams of FIGS. 6 and 7 may be executed or performed substantially simultaneously where appropriate or in parallel to reduce latency and processing times.

The above-described embodiments of the present disclosure are presented for purposes of illustration and not of limitation, and the present disclosure is limited only by the claims which follow.

What is claimed is:

1. A method comprising:
receiving playback information for each of a plurality of media assets, the playback information representing viewing information for the corresponding media asset that each of a plurality of users previously viewed;
retrieving, from the received playback information, a viewing history for the plurality of media assets, wherein the viewing history indicates a number of times each of the plurality of users requested one or more fast-access playback operations while accessing a corresponding one of the media assets;
generating representations of the plurality of media assets;
sorting the representations of the plurality of media assets based on the number of times each of the plurality of users requested the one or more fast-access playback operations to be performed; and
generating for display the sorted representations of the plurality of media assets.

2. The method of claim 1, wherein the one or more fast-access playback operations comprise one or more operations that cause playback of the media assets at either a faster than normal playback speed, or in a different order than that in which the media assets are designed to be played.

3. The method of claim 2, wherein the one or more fast-access playback operations comprise any one or more of fast-forward, rewind, skip, chapter selection, segment selection, skip segment, jump segment, next segment, previous segment, skip advertisement or commercial, next chapter, and previous chapter operations.

4. The method of claim 1, wherein the sorting further comprises sorting the representations based on an average or weighted average of the number of times each of the plurality of users requested the one or more fast-access playback operations.

5. The method of claim 4, wherein the sorting further comprises assigning a highest rank to the media asset corresponding to a highest average or weighted average.

6. The method of claim 4, wherein the sorting further comprises assigning a lowest rank to the media asset corresponding to a highest average or weighted average.

7. The method of claim 1, wherein the sorting further comprises sorting the representations based on a total of the number of times each of the plurality of users requested one or more fast-access playback operations while accessing a corresponding one of the media assets.

8. The method of claim 7, wherein the sorting further comprises assigning a highest rank to the media asset corresponding to a highest value of the total.

9. The method of claim 7, wherein the sorting further comprises assigning a lowest rank to the media asset corresponding to a highest value of the total.

10. The method of claim 1, wherein the number of times each of the plurality of users requested one or more fast-access playback operations is a number of times each of the plurality of users requested a particular type of fast-access playback operation.

11. A system comprising control circuitry configured to:
receive playback information for each of a plurality of media assets, the playback information representing viewing information for the corresponding media asset that each of a plurality of users previously viewed;
retrieve, from the received playback information, a viewing history for the plurality of media assets, wherein the viewing history indicates a number of times each of the plurality of users requested one or more fast-access playback operations while accessing a corresponding one of the media assets;
generate representations of the plurality of media assets;
sort the representations of the plurality of media assets based on the number of times each of the plurality of users requested the one or more fast-access playback operations to be performed; and
generate for display the sorted representations of the plurality of media assets.

12. The system of claim 11, wherein the one or more fast-access playback operations comprise one or more operations that cause playback of the media assets at either a faster than normal playback speed, or in a different order than that in which the media assets are designed to be played.

13. The system of claim 12, wherein the one or more fast-access playback operations comprise any one or more of fast-forward, rewind, skip, chapter selection, segment selection, skip segment, jump segment, next segment, previous segment, skip advertisement or commercial, next chapter, and previous chapter operations.

14. The system of claim 11, wherein the control circuitry is further configured, when sorting, to sort the representations based on an average or weighted average of the number of times each of the plurality of users requested the one or more fast-access playback operations.

15. The system of claim 14, wherein the control circuitry is further configured, when sorting, to assign a highest rank to the media asset corresponding to a highest average or weighted average.

16. The system of claim 14, wherein the control circuitry is further configured, when sorting, to assign a lowest rank to the media asset corresponding to a highest average or weighted average.

17. The system of claim 11, wherein the control circuitry is further configured, when sorting, to sort the representations based on a total of the number of times each of the plurality of users requested one or more fast-access playback operations while accessing a corresponding one of the media assets.

18. The system of claim 17, wherein the control circuitry is further configured, when sorting, to assign a highest rank to the media asset corresponding to a highest value of the total.

19. The system of claim 17, wherein the control circuitry is further configured, when sorting, to assign a lowest rank to the media asset corresponding to a highest value of the total.

20. The system of claim 11, wherein the number of times each of the plurality of users requested one or more fast-access playback operations is a number of times each of the plurality of users requested a particular type of fast-access playback operation.

* * * * *